(12) United States Patent
Zhang et al.

(10) Patent No.: US 11,252,099 B2
(45) Date of Patent: Feb. 15, 2022

(54) DATA STREAM SENDING METHOD AND SYSTEM, AND DEVICE

(71) Applicant: Huawei Technologies Co., Ltd., Shenzhen (CN)

(72) Inventors: Yali Zhang, Beijing (CN); Xiang Qiu, Shenzhen (CN); Yinben Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 16/913,471

(22) Filed: Jun. 26, 2020

(65) Prior Publication Data

US 2020/0351215 A1 Nov. 5, 2020

Related U.S. Application Data

(63) Continuation of application No. PCT/CN2018/119253, filed on Dec. 5, 2018.

(30) Foreign Application Priority Data

Dec. 29, 2017 (CN) .......................... 201711483172.9

(51) Int. Cl.
*H04L 12/801* (2013.01)
*H04L 12/851* (2013.01)
*H04L 29/06* (2006.01)

(52) U.S. Cl.
CPC .............. *H04L 47/39* (2013.01); *H04L 47/12* (2013.01); *H04L 47/24* (2013.01); *H04L 65/4069* (2013.01)

(58) Field of Classification Search
None
See application file for complete search history.

(56) References Cited

U.S. PATENT DOCUMENTS

| 2002/0004842 | A1 | 1/2002 | Ghose et al. | |
|---|---|---|---|---|
| 2005/0078655 | A1 | 4/2005 | Tiller et al. | |
| 2010/0095021 | A1 | 4/2010 | Samuels et al. | |
| 2011/0075555 | A1* | 3/2011 | Ziegler | H04L 47/39 370/229 |
| 2013/0262625 | A1* | 10/2013 | Watson | H04L 69/14 709/217 |
| 2014/0140258 | A1* | 5/2014 | Sadeghi | H04L 47/30 370/312 |
| 2014/0223026 | A1* | 8/2014 | Tamir | H04L 47/39 709/235 |

(Continued)

FOREIGN PATENT DOCUMENTS

| CN | 1618216 A | 5/2005 |
|---|---|---|
| CN | 1878422 A | 12/2006 |

(Continued)

*Primary Examiner* — Yaotang Wang
(74) *Attorney, Agent, or Firm* — Slater Matsil, LLP

(57) ABSTRACT

This application provides a data stream sending method, and the method includes: sending, by a first device, a request packet to a second device; sending, by the first device, a data stream to the second device after the first device sends the request packet and before the first device receives the response packet sent by the second device; and receiving, by the first device, the response packet that is sent by the second device and that is in response to the request packet.

18 Claims, 6 Drawing Sheets

(56) References Cited

U.S. PATENT DOCUMENTS

| | | | |
|---|---|---|---|
| 2014/0301187 A1* | 10/2014 | DeCusatis | H04L 47/39 370/230 |
| 2017/0063959 A1 | 3/2017 | Izquierdo et al. | |
| 2017/0188056 A1 | 6/2017 | Do et al. | |
| 2017/0223635 A1 | 8/2017 | Dinan | |

FOREIGN PATENT DOCUMENTS

| CN | 101127704 A | 2/2008 |
|---|---|---|
| CN | 101277204 A | 10/2008 |
| CN | 101477637 A | 7/2009 |
| CN | 103701626 A | 4/2014 |
| CN | 105245568 A | 1/2016 |

\* cited by examiner

DATA STREAM SENDING METHOD AND SYSTEM, AND DEVICE

CROSS-REFERENCE TO RELATED APPLICATIONS

This application is a continuation of International Application No. PCT/CN2018/119253, filed on Dec. 5, 2018, which claims priority to Chinese Patent Application No. 201711483172.9, filed on Dec. 29, 2017. The disclosures of the aforementioned applications are hereby incorporated by reference in their entireties.

TECHNICAL FIELD

The present invention relates to the field of communications technologies, and in particular, to a data stream sending method and system, and a device.

BACKGROUND

When a plurality of transmit ends simultaneously send data streams to a same receive end, congestion occurs at the receive end. There are many congestion control mechanisms for a transport layer. For example, a source end device adjusts a sending rate based on a received congestion notification packet sent by a congested device in a network, to reduce network congestion and a delay. A typical congestion control mechanism includes, for example, the data center transmission control protocol (DCTCP for short) or a remote direct memory access technology. However, in all the foregoing technologies, adjustment is performed after congestion occurs. In this case, congestion cannot be quickly relieved and a packet loss may easily occur. In addition, because the source end device does not determine a reduction size of the rate, excessive rate reduction may easily occur, so that under throughput occurs in the network.

In another congestion control mechanism, a transmit end first sends a request packet to a receive end, and the request packet is used to request the receive end to allow the transmit end to send a data stream. After receiving the request packet sent by the transmit end, the receive end sends a response packet to the transmit end to instruct the transmit end to send the data stream. However, in round-trip time of sending the request packet by the transmit end to the receive end, a bandwidth is usually wasted. In particular, when a relatively small quantity of data streams need to be sent by the transmit end, more bandwidths are wasted.

SUMMARY

Embodiments of this application provide a data stream sending method and system, and a device, so as to avoid a bandwidth waste when a transmit end sends a data stream to a receive end.

According to a first aspect, this application provides a data stream sending method. The method includes: sending, by a first device, a request packet to a second device, where the request packet is used to request the second device to grant credit to the first device, and the credit is used to indicate an amount of data that the second device allows the first device to send to the second device; sending, by the first device, a data stream to the second device after the first device sends the request packet and before the first device receives a response packet sent by the second device; and receiving, by the first device, the response packet that is sent by the second device and that is in response to the request packet, where the response packet includes first credit, and the first credit is used to indicate the amount of the data that the second device allows the first device to send to the second device.

According to the method, within one round-trip delay between the first device and the second device, the first device not only can send the request packet to the second device, but also can send the data stream to the second device. In this way, a bandwidth waste caused by only sending, by the first device, a request packet to the second device can be avoided, to fully use network resources.

In a possible design, a bandwidth value of a link from the first device to the second device is C, duration from a time at which the first device sends the request packet to a time at which the first device receives the response packet sent by the second device is T, a product of T and C is a bandwidth-delay product (BDP), a sum of a size of the data stream and a size of the request packet is A, and A is less than or equal to the BDP.

According to the foregoing solution, within the duration from the time at which the first device sends the request packet to the time at which the first device receives the response packet sent by the second device, the sum of the size of the request packet and the size of the data stream is limited to being less than or equal to the bandwidth-delay product, to avoid that the sum of the size of the request packet sent by the first device and the size of the data stream sent by the first device is greater than the BDP of the link. If the sum of the size of the request packet sent by the first device and the size of the data stream sent by the first device is greater than the BDP of the link, congestion is caused.

In a possible design, the method further includes: in response to the response packet received by the first device, sending, by the first device, a notification packet to the second device, where the notification packet is used to notify the second device that the first device completes sending of the data stream to the second device.

According to the foregoing method, when a quantity of data streams from the first device is less than or equal to the amount of the first credit, the first device may complete sending of the data stream within a round-trip time of sending the request packet by the first device to the second device. In this way, the first device sends the notification packet to the second device, the second device is notified that sending of the data stream is completed. Therefore, when learning of that the sending of the data stream is completed, the second device may disconnect from the first device or detect whether a packet loss occurs in the data stream.

In a possible design, a forwarding priority of the request packet is higher than a forwarding priority of the data stream.

According to the foregoing solution, the request packet carries the forwarding priority higher than that of the data stream, to reduce a probability that a packet loss occurs in a packet forwarding process.

In a possible design, after the receiving, by the first device, the response packet that is sent by the second device and that is in response to the request packet, the method further includes: sending, by the first device, a new data stream to the second device, where a quantity of new data streams is less than or equal to the amount indicated by the first credit.

According to the foregoing solution, because the amount indicated credit is a size of a data stream that is sent by the first device and that may be received by the second device, and a quantity of new data streams sent by the first device to the second device is less than or equal to the amount indicated by the credit, to avoid a case in which the quantity of new data streams sent by the first device is greater than the amount indicated by the credit, and consequently, congestion occurs at the second device.

In a possible design, the first device includes a source queue pair (QP), the second device includes a destination QP, and the source QP and the destination QP constitute one QP. The request packet, the response packet, and the data stream are sent based on the QP. A destination QP field in the request packet carries an identifier of the destination QP, a destination QP field in the response packet carries an identifier of the source QP, the data stream carries the identifier of the destination QP, and the new data stream carries the identifier of the destination QP.

According to the foregoing solution, in the network, remote direct memory access over converged Ethernet (RoCE) may be used, and the request packet, the response packet, and the data stream are sent by using an RoCE packet.

According to a second aspect, this application provides a data stream sending method. The method includes: receiving, by a second device, a request packet sent by a first device, where the request packet is used to request the second device to grant credit to the first device, and the credit is used to indicate an amount of data that the second device allows the first device to send to the second device; sending, by the second device, a response packet that is in response to the request packet to the first device, where the response packet includes first credit, and the first credit is used to indicate the amount of data that the second device allows the first device to send to the second device; and receiving, by the second device, a data stream sent by the first device, where the data stream is sent by the first device after the first device sends the request packet and before the first device receives the response packet sent by the second device.

In a possible design, the method further includes: a bandwidth value of a link from the first device to the second device is C, duration from a time at which the first device sends the request packet to a time at which the first device receives the response packet sent by the second device is T, a product of T and C is a bandwidth-delay product BDP, a sum of a size of the data stream and a size of the request packet is A, and A is less than or equal to the BDP.

In a possible design, the method further includes: receiving, by the second device, a notification packet sent by the first device, where the notification packet is used to notify the second device that the first device completes sending of the data stream to the second device.

In a possible design, after the sending, by the second device, a response packet that is in response to the request packet to the first device, the method further includes: receiving, by the second device, a new data stream sent by the second device, where a quantity of new data streams is less than or equal to the amount indicated by the first credit.

According to a third aspect, this application provides a first device for sending a data stream, and the first device performs the method according to any one of the first aspect or the possible implementations of the first aspect. The first device includes a unit configured to perform the method according to any one of the first aspect or the possible implementations of the first aspect.

According to a fourth aspect, this application provides a second device for sending a data stream, and the second device performs the method according to any one of the second aspect or the possible implementations of the second aspect. The second device includes a unit configured to perform the method according to any one of the second aspect or the possible implementations of the second aspect.

According to a fifth aspect, a network device is provided. The network device includes a processor, a network interface, and a memory. The memory may be configured to store program code. The processor is configured to invoke the program code in the memory to perform the method according to any one of the first aspect or the possible implementations of the first aspect. For details, refer to the detailed descriptions in the method example. Details are not described herein again.

According to a sixth aspect, a network device is provided. The network device includes a processor, a network interface, and a memory. The memory may be configured to store program code. The processor is configured to invoke the program code in the memory to perform the method according to any one of the second aspect or the possible implementations of the second aspect. For details, refer to the detailed descriptions in the method example. Details are not described herein again.

According to a seventh aspect, this application provides a data stream sending system. The system includes the first device and the second device provided in the foregoing aspects. The first device is configured to: send a request packet to the second device, send a data stream to the second device after the first device sends the request packet and before the first device receives the response packet sent by the second device, and receive the response packet that is sent by the second device and that is in response to the request packet. The request packet is used to request the second device to grant credit to the first device. The credit is used to indicate an amount of data that the second device allows the first device to send to the second device. The response packet includes first credit, and the first credit is used to indicate the amount of the data that the second device allows the first device to send to the second device. The second device is configured to: receive the request packet sent by the first device, receive the data stream sent by the first device, and send the response packet that is in response to the request packet to the first device.

According to an eighth aspect, a computer storage medium is provided. The computer storage medium is configured to store a computer software instruction used by the foregoing network device or a controller, and the computer software instruction includes a program designed to perform the foregoing aspects.

DETAILED DESCRIPTION OF ILLUSTRATIVE EMBODIMENTS

The following describes embodiments of the present invention with reference to accompanying drawings.

In the specification, claims, and the accompanying drawings of the present invention, the terms "first", "second", and the like are intended to distinguish between similar objects but do not necessarily indicate a specific order or sequence. It should be understood that the data used in such a way may be changed in a proper circumstance, so that the embodiments described herein can be implemented in an order other than the order illustrated or described herein. In addition, the terms "include", "have", and any other variants thereof are intended to cover non-exclusive inclusion, for example, a process, method, system, product, or device that includes a list of steps or units is not necessarily limited to those expressly listed steps or units, but may include other steps or units that are not expressly listed or inherent to such a process, method, product, or device.

Figure 1:
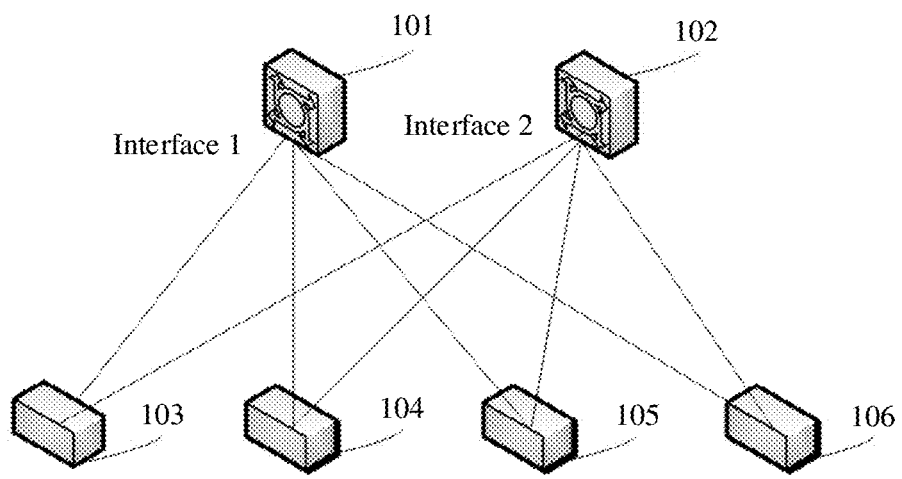
FIG. 1 is a schematic diagram of an application scenario according to an embodiment of the present invention.

FIG. 1 shows a possible application scenario according to an embodiment of the present invention. The scenario includes a transmit end device 103, a transmit end device 104, a transmit end device 105, a transmit end device 106, a receive end device 101, and a receive end device 102. The transmit end devices 103 to 106 are configured to send data streams to the receive end device 101 and the device 102, and the receive end device 101 and the receive end device 102 are configured to: receive and process the data streams sent by the transmit end devices 103 to 106. The transmit end devices 103 to 106, the receive end device 101, and the receive end device 102 may be devices such as servers in a network. The application scenario may be a high-performance data analysis scenario or an artificial intelligence computing scenario. In the artificial intelligence scenario, a computing node (for example, a Worker) 103, a computing node 104, a computing node 105, and a computing node 106 are configured to process respective received data, to obtain processing results. A parameter server (English: parameter server) 101 and a parameter server 102 are configured to: receive processed data sent by a computing node connected to the parameter server 101 and the parameter server 102, summarize the data, and then send the summarized data to each computing node connected to the parameter server 101 and the parameter server 102. For example, the parameter server 101 receives data that is sent by the computing node 103, the computing node 104, the computing node 105, and the computing node 106 and that is processed by each computing node, summarizes the obtained data, and then sends the summarized data to the computing node 103, the computing node 104, the computing node 105, and the computing node 106. The parameter server 102 may perform operations similar to those performed by the parameter server 101, and details are not described herein again. Times at which the computing node 103, the computing node 104, the computing node 105, and the computing node 106 process data are relatively close. Therefore, the computing node 103, the computing node 104, the computing node 105, and the computing node 106 simultaneously send data to the parameter server 101 and the parameter server 102. For example, a rate of an interface 1 of the parameter server 101 is 1000 megabits per second (Mbit/s). If within a unit time, the computing node 103, the computing node 104, the computing node 105, and the computing node 106 simultaneously send data streams to the interface 1 of the parameter server 101 at a rate greater than 1000 Mbit/s, congestion occurs on the interface 1. To relieve congestion in a network, usually, in a period before the computing node 103 sends a data stream to the parameter server 101, the computing node 103 first sends a request packet to the parameter server 101. After receiving the request packet, the parameter server 101 sends a response packet including indication credit to the computing node 103. The computing node 103 receives the response packet, and sends the data stream to the parameter server 101. In this way, although when congestion occurs on an interface of a receive end device, a transmit end device is prevented from continuously sending a data stream to the receive end device. However, in a period before the transmit end device sends the data stream to the receive end device, a bandwidth is wasted if the transmit end device only sends a request packet to the receive end device. In particular, when a data stream that needs to be sent by a transmit end is relatively small, more bandwidths are wasted.

The embodiments of the present invention provide a data stream sending method, and a device and a system that are based on the method. In the method, a transmit end device sends a data stream to a receive end device while sending a request packet to the receive end device, and the receive end detects the received data stream, to determine whether a packet loss occurs in the data stream. In this way, a bandwidth waste caused by only sending, the transmit end, the request packet can be avoided, to fully use network resources. The method, the device, and the system are based on a same inventive concept. Because problem resolving principles of the method, the device, and the system are similar, mutual reference may be made to implementation of the device and the method, and mutual reference may also be made to implementation of the system and the method. Repeated descriptions are not further provided.

Figure 2:
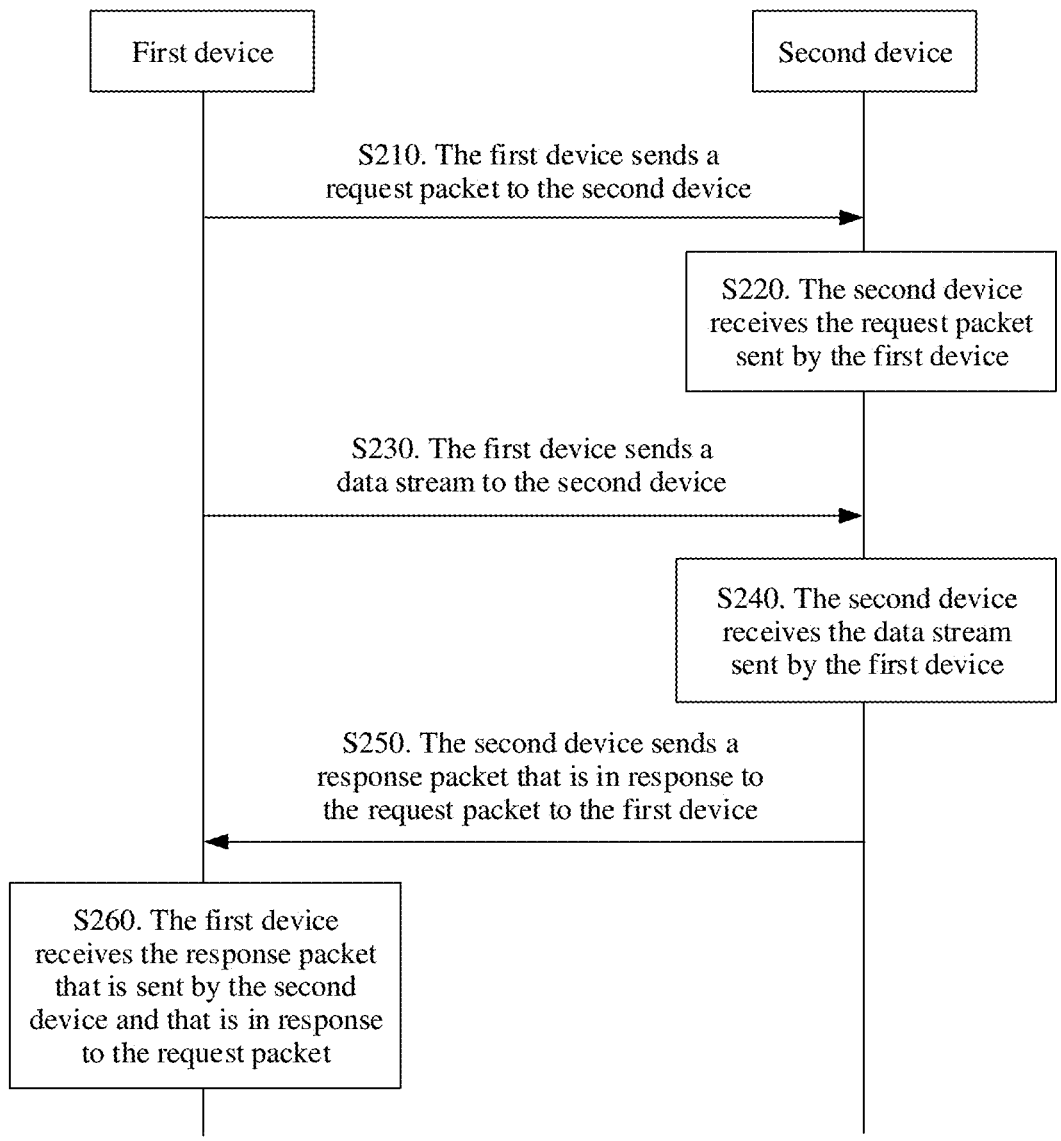
FIG. 2 is a schematic flowchart of a data stream sending method according to an embodiment of the present invention.

With reference to the application scenario shown in FIG. 1, FIG. 2 shows a data stream sending method according to an embodiment of the present invention. A first device in FIG. 2 may be any device in the computing nodes 103 to 106 in FIG. 1, and a second device may be either the parameter server 101 or the parameter server 102 in FIG. 1. The method includes the following steps.

S210. The first device sends a request packet to the second device, where the request packet is used to request the second device to grant credit to the first device, and the credit is used to indicate an amount of data that the second device allows the first device to send to the second device.

In an example, the request packet carries a forwarding priority, so that the request packet is preferably forwarded in a forwarding process starting from the first device to the second device, to avoid a case in which a packet loss occurs in a process of forwarding the request packet. For example, the request packet carries a highest forwarding priority, or the request packet carries a forwarding priority higher than a forwarding priority of a data stream sent by the first device.

In an example, the first device is a source end device, and the second packet is a destination end device. Both the first device and the second device support receive/transmit stream control controlled by credit. To be specific, both the first device and the second device use a request-authorization protocol. In the protocol, a source end needs to send a request packet to a destination end, to trigger the destination end to send first credit to the source end. The request packet is used to request a destination end device to grant a quantity of data streams that are sent by the source end to the destination end, and the first credit is used to indicate an amount of data that the destination end allows a remote end device to send to the destination end.

In an example, the network uses a remote direct memory access over converged Ethernet (RoCE), and the request packet is identified by using a reserved field of a base transport header (BTH) in an RoCE packet. To be specific, the request packet is identified by using the reserved field of the base transport header in the RoCE packet, to indicate that the RoCE packet is a request packet used to request the second device to grant credit to the first device.

S220. The second device receives the request packet sent by the first device.

S230. The first device sends a data stream to the second device after the first device sends the request packet and before the first device receives the response packet sent by the second device.

In an example, the request packet does not include the data stream, and the forwarding priority of the request packet is higher than a forwarding priority of the data stream. In other words, the request packet does not carry the data stream, and the request packet and the data stream are two independent packets. After receiving the request packet and the data stream, a network device preferably forwards the request packet.

In an example, the second device may further receive a first data stream sent by the first device. A time at which the second device receives the request packet and a time at which the first device sends the first data stream are not limited. The second device may simultaneously receive the request packet and the first data stream, or the second device may first receive the request packet and then receive the first data stream.

In an example, a time at which the first device sends the data stream to the second device falls within duration from a time at which the first device sends the request packet to a time at which the second device receives the response packet sent by the second device. The time limitation may be represented by a round-trip time (RTT). To be specific, the first device sends the data stream to the second device in an RTT that is after the first device sends the request packet.

Optionally, a bandwidth value of a link from the first device to the second device is C, duration from the time at which the first device sends the request packet to the time at which the first device receives the response packet sent by the second device is T, a product of T and C is a bandwidth-delay product BDP, a sum of a size of the data stream and a size of the request packet is A, and A is less than or equal to the BDP.

In an example, the bandwidth-delay product is a product of a link bandwidth and a bidirectional communication delay, and indicates a maximum amount of data in the network at a specific time. In this way, the sum of the size of the request packet sent by the first device and the size of the data stream sent by the first device is controlled to not exceed a maximum payload of the link, so that network congestion can be avoided while a bandwidth is used.

S240. The second device receives the data stream sent by the first device, where the data stream is sent by the first device after the first device sends the request packet and before the first device receives the response packet sent by the second device.

In an example, RoCE is used for the data stream, and the data stream is encapsulated into an RoCE packet.

S250. The second device sends the response packet that is in response to the request packet to the first device, where the response packet includes the first credit, and the first credit is used to indicate the amount of data that the second device allows the first device to send to the second device.

In an example, when receiving the request packet sent by the first device, the second device sends the response packet that is in response to the request packet to the first device. The response packet carries the first credit, and the first credit is used to indicate the amount of the data that the second device allows the first device to send to the second device. In other words, the first credit indicates a quantity of data streams that is sent by the first device and that may be received by the second device.

In an example, the response packet that is sent by the second device and that is in response to the request packet may alternatively be an RoCE packet, and the response packet includes the first credit. The first credit may be identified by using a reserved field of a BTH in the RoCE packet. To be specific, the first credit is identified by using the reserved field of the base transport header in the RoCE packet, to indicate that the RoCE packet is a response packet used by the second device to grant credit to the first device.

S260. The first device receives the response packet that is sent by the second device and that is in response to the request packet.

Optionally, in response to the response packet received by the first device, the first device sends a notification packet to the second device. The notification packet is used to notify the second device that the first device completes sending of the data stream to the second device.

In an example, when receiving the response packet sent by the second device, the first device determines that sending of the data stream that needs to be sent by the first device to the second device is completed after the first device sends the request packet and before the second device receives the response packet sent by the second device. The first device sends the notification packet to the second device, and the notification packet is used to notify the second device that the first device completes sending of the data stream to the second device.

In an example, when the sum of the size of the request packet sent by the first device to the second device and the size of the data stream sent by the first device to the second device is less than or equal to the BDP, it indicates that sending of the data stream that needs to be sent by the first device is completed after the first device sends the request packet and before the second device receives the response packet sent by the second device.

Optionally, the method further includes: in response to the response packet received by the first device, receiving, by the second device, the notification packet sent by the first device, where the notification packet is used to notify the second device that the first device completes sending of the data stream to the second device.

Optionally, after the first device receives the response packet that is sent by the second device and that is in response to the request packet, the method further includes: sending, by the first device, a new data stream to the second device, where a quantity of new data streams is less than or equal to the amount indicated by the first credit.

In an example, when the first device receives, from the second device, the response packet that grants the first device to send a data stream, the new data stream sent by the first device to the second device and the data stream sent by the first device may be a same type of data streams. To be specific, 5-tuple information of the new data stream is the same as that of the data stream, or a source end is the same as a destination end. The new data stream and the data stream may be different types of data streams. To be specific, 5-tuple information of the data stream is different from that of the new data stream.

Optionally, after the second device sends the response packet that is in response to the request packet to the first device, the method further includes: receiving, by the second device, the new data stream sent by the first device, where the quantity of new data streams is less than or equal to the amount indicated by the first credit.

Optionally, the first device includes a source QP, the second device includes a destination QP, and the source QP and the destination QP constitute one QP. The request packet, the response packet, and the data stream are sent based on the QP. A destination QP field in the request packet carries an identifier of the destination QP. A destination QP field in the response packet carries an identifier of the source QP, the data stream carries the identifier of the destination QP, and the new data stream carries the identifier of the destination QP.

In an example, the first device and the second device use the RoCE, and the RoCE is used for all of the request packet, the response packet, and the data stream. The first device and the second device send the foregoing packets by using the QP.

Figure 3:
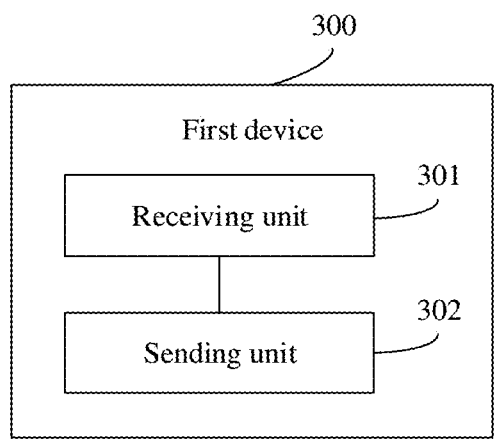
FIG. 3 is a schematic structural diagram of a first device according to an embodiment of the present invention.

FIG. 3 is a possible schematic structural diagram of the first device in the foregoing embodiment. The first device 300 may implement a function of the first device in the embodiment shown in FIG. 2. Referring to FIG. 3, the first device 300 includes a receiving unit 301 and a sending unit 302. These units may perform corresponding functions of the first device in the foregoing method embodiment. The receiving unit 301 is configured to support the first device 300 to perform the process S260 in FIG. 2. The sending unit 302 is configured to support the first device 300 to perform the processes S210 and S230 in FIG. 2 and/or another process performed by the first device in the technology described in this specification. For example, the receiving unit 301 is configured to perform various information reception performed by the first device in the foregoing method embodiment. The sending unit 301 is configured to perform various information sending performed by the first device in the foregoing method embodiment. For example, the receiving unit 301 is configured to receive a response packet that is sent by the second device and that is in response to the request packet. The response packet includes first credit. The first credit is used to indicate an amount of data that the second device allows the first device to send to the second device. The sending unit 302 is configured to: send the request packet to the second device, and send a data stream to the second device after the first device sends the request packet and before the first device receives the response packet sent by the second device. The request packet is used to request the second device to grant credit to the first device. The credit is used to indicate the amount of the data that the second device allows the first device to send to the second device. For a specific execution process, refer to the detailed descriptions of corresponding steps in the foregoing embodiment shown in FIG. 2. Details are not described herein again.

Figure 4:
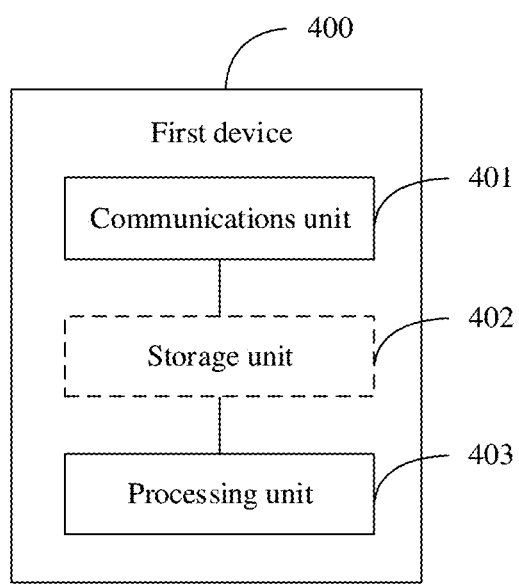
FIG. 4 is another schematic structural diagram of a first device according to an embodiment of the present invention.

When an integrated unit is used, FIG. 4 is another possible schematic structural diagram of the first device in the foregoing embodiments. The first device 400 may also implement a function of the first device in the embodiment shown in FIG. 2. The first device 400 includes a communications unit 401, and may further include a storage unit 402 and a processing unit 403. The communications unit 401 is configured to support the first device 400 to communicate with another network entity, for example, communicate with the second device shown in FIG. 2. For example, the communications unit 401 is configured to support the first device 400 to perform the processes S210, S230, and S260 in FIG. 2. The processing unit 403 is configured to control and manage an action of the first device 400. The storage unit 402 is configured to store program code and data of the first device 400. For a specific execution process, refer to the detailed descriptions of corresponding steps in the foregoing embodiment shown in FIG. 2. Details are not described herein again.

Figure 8:
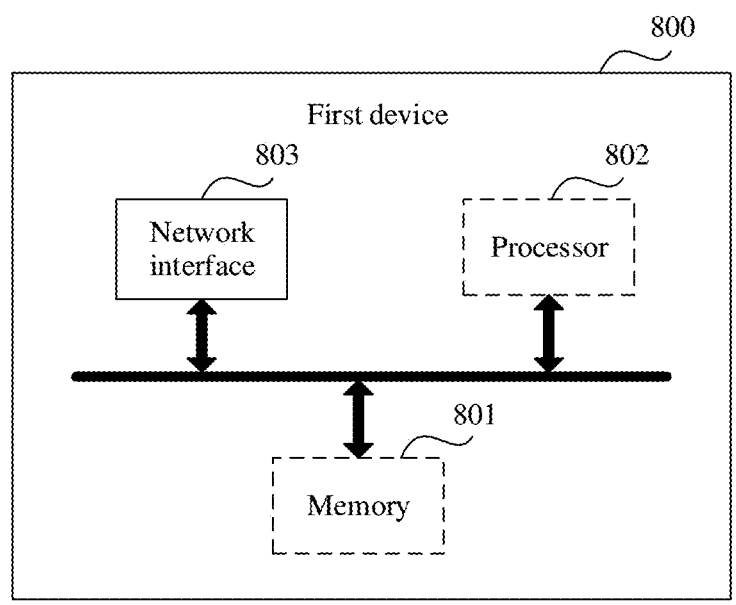
FIG. 8 is a schematic diagram of a hardware structure of another first device according to an embodiment of the present invention.

FIG. 8 is a possible schematic structural diagram of a first device 800. The processing unit 403 in FIG. 4 may be a processor 802 of the first device shown in FIG. 8, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the embodiments of the present invention. The processor may alternatively be a combination implementing a computing function, for example, a combination of one or more microprocessors, or a combination of a DSP and a microprocessor. The communications unit 401 may be a network interface 803, and the storage unit 402 may be a memory 801. The memory 801, the processor 802, and the network interface 803 may be coupled by using a bus.

Figure 5:
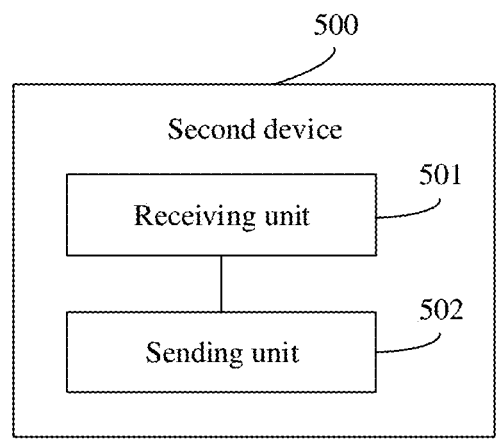
FIG. 5 is a schematic structural diagram of a second device according to an embodiment of the present invention.

FIG. 5 is a possible schematic structural diagram of the second device in the foregoing embodiments. The second device 500 may implement a function of the second device in the embodiment shown in FIG. 2. Referring to FIG. 5, the second device 500 includes a receiving unit 501 and a sending unit 502. These units may perform corresponding functions of the second device in the foregoing method embodiment. The receiving unit 501 is configured to support the second device 500 to perform the processes S220 and S240 in FIG. 2 and/or another process performed by the second device in the technology described in this specification. The sending unit 502 is configured to support the second device 500 to perform the process S250 in FIG. 2 and/or another process performed by the second device in the technology described in this specification. For example, the receiving unit 501 is configured to perform various information reception performed by the second device in the foregoing method embodiment. The sending unit 502 is configured to perform various information sending performed by the second device in the foregoing method embodiment. For example, the receiving unit 501 is configured to receive a request packet sent by a first device, and is further configured to receive a data stream sent by the first device after the first device sends the request packet and before the first device receives the response packet sent by the second device. The request packet is used to request the second device to grant credit to the first device. The credit is used to indicate an amount of data that the second device allows the first device to send to the second device. The sending unit 504 is configured to send the response packet that is in response to the request packet to the first device. The response packet includes first credit. The first credit is used to indicate the amount of the data that the second device allows the first device to send to the second device. For a specific execution process, refer to the detailed descriptions of corresponding steps in the foregoing embodiment shown in FIG. 2. Details are not described herein again.

Figure 6:
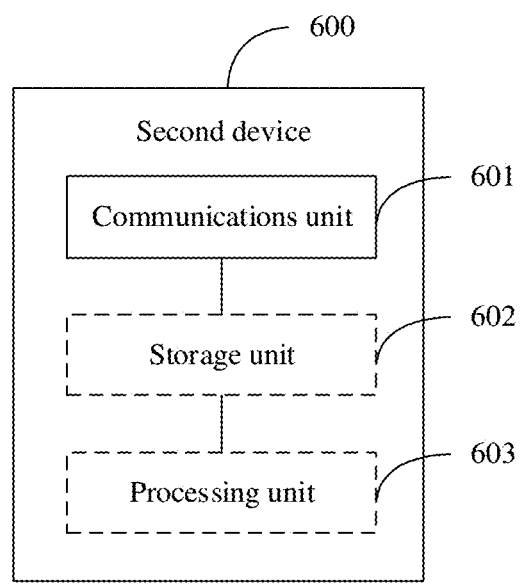
FIG. 6 is another schematic structural diagram of a second device according to an embodiment of the present invention.

When an integrated unit is used, FIG. 6 is another possible schematic structural diagram of the second device in the foregoing embodiments. The second device 600 may also implement a function of the second device in the embodiment shown in FIG. 2. The second device 600 includes a communications unit 601, and may further include a storage unit 602 and a processing unit 603. The communications unit 601 is configured to support the second device 600 to communicate with another network entity, for example, communicate with the first device shown in FIG. 2. For example, the communications unit 601 is configured to support the second device 600 to perform the processes S220, S240, and S250 in FIG. 2. The processing unit 603 is configured to control and manage an action of the first device 600. The storage unit 602 is configured to store program code and data of the second device 600. For a specific execution process, refer to the detailed descriptions of corresponding steps in the foregoing embodiment shown in FIG. 2. Details are not described herein again.

Figure 9:
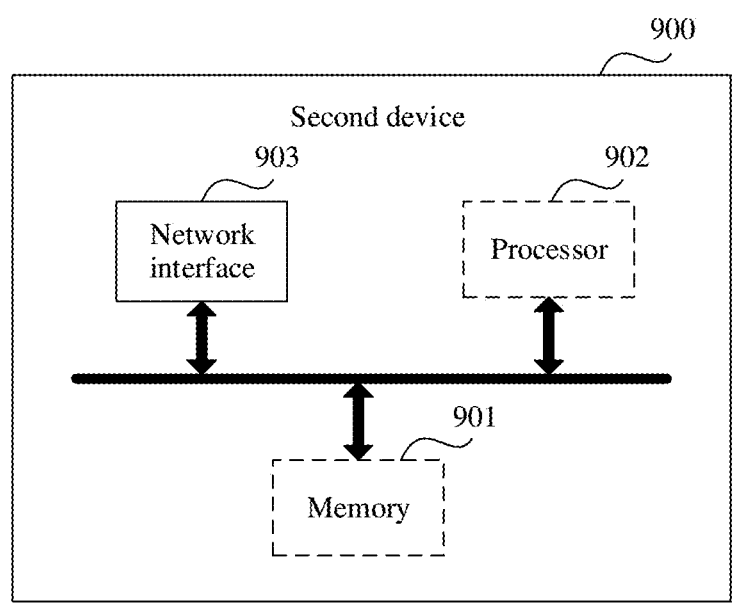
FIG. 9 is a schematic diagram of a hardware structure of another second device according to an embodiment of the present invention.

FIG. 9 is a schematic structural diagram of a second device 900 according to an embodiment of this application. The processing unit 603 in FIG. 6 may be a processor 902 in FIG. 9, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the embodiments of the present invention. The processor may alternatively be a combination implementing a computing function, for example, a combination of one or more microprocessors, or a combination of a DSP and a microprocessor. The communications unit 601 may be a network interface 903, and the storage unit 602 may be a memory 901. The memory 901, the processor 902, and the network interface 903 may be coupled by using a bus.

It should be noted that, in this embodiment of the present invention, unit division is merely an example, and is merely a logical function division. In actual implementation, another division manner may be used. Function units in the embodiments of the present invention may be integrated into one processing unit, or each of the units may exist alone physically, or two or more units may be integrated into one unit. For example, in the foregoing embodiment, the receiving unit and the sending unit may be a same unit or different units. The integrated unit may be implemented in a form of hardware, or may be implemented in a form of a software function unit.

Figure 7:
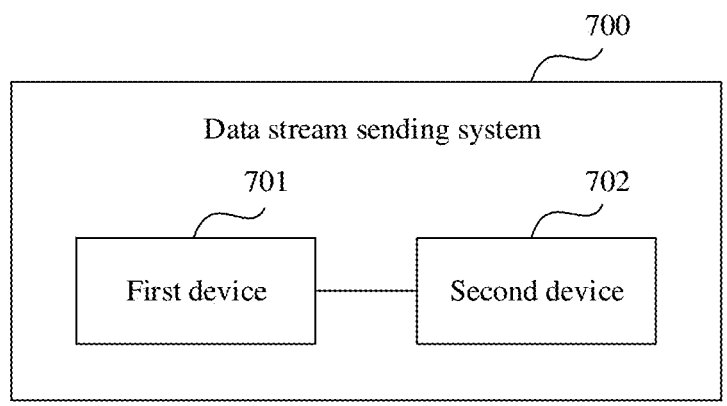
FIG. 7 is a schematic structural diagram of a data stream sending system according to an embodiment of the present invention.

Referring to FIG. 7, an embodiment of the present invention provides another data stream sending system 700. The system 700 is configured to implement the data stream sending method in the foregoing method embodiment. The system 700 includes a first device 701 and a second device 702. The first device 701 is configured to implement functions of the first device in the embodiment shown in FIG. 2, and the second network device 702 is configured to implement functions of the second network device in the embodiment shown in FIG. 2. For example, the first device 701 performs the processes S210, S230, and S260 in FIG. 2 and/or another process performed by the first device in the technology described in this specification. The second network device 702 is configured to perform the processes S220, S240, and S250 in FIG. 2, and/or is configured to perform another process performed by the second device in the technology described in this specification.

An embodiment of the present invention further provides a storage medium, configured to store a software instruction used in the foregoing embodiments. The software instruction includes a program used to perform the method shown in the foregoing embodiments. When the software instruction is executed on a computer or a device, the computer or the device is enabled to perform the method in the foregoing method embodiment.

It should be noted that any apparatus embodiment described above is merely an example. The units described as separate parts may or may not be physically separate, and parts displayed as units may or may not be physical units, may be located in one position, or may be distributed on a plurality of network units. Some or all of the modules may be selected based on an actual requirement to achieve the objectives of the solutions of the embodiments. In addition, in the accompanying drawings of the first device or the controller embodiments provided by the present invention, connection relationships between modules indicate that the modules have communication connections with each other, which may be implemented as one or more communications buses or signal cables. A person of ordinary skill in the art may understand and implement the embodiments without creative efforts.

Methods or algorithm steps described in combination with the content disclosed in the embodiments of the present invention may be implemented in a form of hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to a processor, so that the processor can read information from the storage medium, and may write information into the storage medium. Certainly, the storage medium may alternatively be a component of the processor. The processor and the storage medium may be located in an ASIC. In addition, the ASIC may be located in a core network interface device. Certainly, the processor and the storage medium may be in the core network interface device as discrete components.

A person skilled in the art should be aware that in the foregoing one or more examples, the functions described in the present invention may be implemented by using hardware, software, firmware, or any combination thereof. When the functions are implemented by software, the functions may be stored in a computer readable medium or transmitted as one or more instructions or code in a computer readable medium. The computer readable medium includes a computer storage medium and a communications medium, and the communications medium includes any medium that facilitates transmission of a computer program from one place to another. The storage medium may be any available medium accessible to a general-purpose computer or special-purpose computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, wherein the method comprises:
sending, by a first device, a request packet to a second device, wherein the request packet requests the second device to grant credit to the first device;
receiving, by the first device, a response packet sent by the second device in response to the request packet, wherein the response packet comprises first credit, and the first credit indicates an amount of data that the second device allows the first device to send to the second device; and
sending, by the first device, a data stream to the second device after the first device sends the request packet and before the first device receives the response packet sent by the second device.

2. The method according to claim 1, wherein a bandwidth value of a link from the first device to the second device is C, a duration from a time at which the first device sends the request packet to a time at which the first device receives the response packet sent by the second device is T, a product of T and C is a bandwidth-delay product (BDP), a sum of a size of the data stream and a size of the request packet is A, and A is less than or equal to the BDP.

3. The method according to claim 2, further comprising:
in response to the response packet being received by the first device, sending, by the first device, a notification packet to the second device, wherein the notification packet notifies the second device that the first device has completed sending the data stream to the second device.

4. The method according to claim 1, wherein after receiving, by the first device, the response packet sent by the second device in response to the request packet, the method further comprises:
sending, by the first device, one or more new data streams to the second device, wherein a quantity of new data streams is less than or equal to the amount indicated by the first credit.

5. The method according to claim 4, wherein:
the first device comprises a source queue pair (QP), the second device comprises a destination QP, the source QP and the destination QP constitute one QP, and the request packet, the response packet, and the data stream are sent based on the QP;
a destination QP field in the request packet carries an identifier of the destination QP, a destination QP field in the response packet carries an identifier of the source QP, and the data stream carries the identifier of the destination QP; and
each of the one or more new data streams carries the identifier of the destination QP.

6. The method according to claim 1, wherein a forwarding priority of the request packet is higher than a forwarding priority of the data stream.

7. The method according to claim 1, wherein the request packet is identified by using a reserved field of a base transport header (BTH) in a remote direct memory access over converged Ethernet (RoCE) packet.

8. The method according to claim 1, wherein the data stream is encapsulated into a remote direct memory access over converged Ethernet (RoCE) packet.

9. A first device, wherein the device comprises:
a network interface; and
a processor coupled to the network interface; and
a non-transitory computer-readable storage medium storing a program to be executed by the processor, the program including instructions for:
sending a request packet to a second device, wherein the request packet requests the second device to grant credit to the first device;
sending a data stream to the second device after the first device sends the request packet and before the first device receives a response packet sent by the second device; and
receiving the response packet that is sent by the second device in response to the request packet, wherein the response packet comprises a first credit, and the first credit indicates an amount of data that the second device allows the first device to send to the second device.

10. The first device according to claim 9, wherein a bandwidth value of a link from the first device to the second device is C, a duration from a time at which the first device sends the request packet to a time at which the first device receives the response packet sent by the second device is T, a product of T and C is a bandwidth-delay product (BDP), a sum of a size of the data stream and a size of the request packet is A, and A is less than or equal to the BDP.

11. The first device according to claim 9, wherein the program further includes instructions for:
sending a notification packet to the second device, wherein the notification packet notifies the second device that the first device has completed sending the data stream to the second device.

12. The first device according to claim 9, wherein the program further includes instructions for:
sending one or more new data streams to the second device after the first device receives the response packet that is sent by the second device in response to the request packet, wherein a quantity of new data streams is less than or equal to the amount indicated by the first credit.

13. The first device according to claim 12, wherein:
the first device comprises a source queue pair (QP), the second device comprises a destination QP, the source QP and the destination QP constitute one QP, and the request packet, the response packet, and the data stream are sent based on the QP;
a destination QP field in the request packet carries an identifier of the destination QP, a destination QP field in the response packet carries an identifier of the source QP, and the data stream carries the identifier of the destination QP; and
each of the one or more new data streams carries the identifier of the destination QP.

14. The first device according to claim 9, wherein a forwarding priority of the request packet is higher than a forwarding priority of the data stream.

15. A second device, wherein the device comprises:
a network interface; and
a processor coupled to the network interface; and
a non-transitory computer-readable storage medium storing a program to be executed by the processor, the program including instructions for:
  receiving a request packet sent by a first device, wherein the request packet requests the second device to grant credit to the first device;
  receiving a data stream sent by the first device, wherein the data stream is sent by the first device after the first device sends the request packet and before the first device receives a response packet sent by the second device; and
  sending the response packet to the first device in response to receiving the request packet to, wherein the response packet comprises a first credit, and the first credit indicates an amount of data that the second device allows the first device to send to the second device.

16. The device according to claim 15, wherein a bandwidth value of a link from the first device to the second device is C, a duration from a time at which the first device sends the request packet to a time at which the first device receives the response packet sent by the second device is T, a product of T and C is a bandwidth-delay product (BDP), a sum of a size of the data stream and a size of the request packet is A, and A is less than or equal to the BDP.

17. The device according to claim 16, wherein the program further includes instructions for:
  receiving a notification packet sent by the first device, wherein the notification packet notifies the second device that the first device has completed sending of the data stream to the second device.

18. The device according to claim 15, wherein the program further includes instructions for:
  after the second device sends the response packet in response to receiving the request packet to the first device, receive one or more new data streams sent by the first device, wherein a quantity of new data streams is less than or equal to the amount indicated by the first credit.

* * * * *